United States Patent [19]

Wynn et al.

[11] Patent Number: 5,482,232
[45] Date of Patent: Jan. 9, 1996

[54] APPARATUS AND METHOD FOR WALL-MOUNTED HARDWARE SYSTEM

[75] Inventors: Stephen A. Wynn; Ernest R. Pearce; Michael H. D'Amico; Ursula M. Conway; Troy W. Newberry, all of Las Vegas, Nev.

[73] Assignee: Mirage Resorts, Incorporated, Las Vegas, Nev.

[21] Appl. No.: 80,194

[22] Filed: Jun. 21, 1993

[51] Int. Cl.⁶ .................................................. A47B 81/06
[52] U.S. Cl. ................. 248/27.1; 248/205.1; 248/222.51
[58] Field of Search ............................... 248/27.1, 205.1, 248/208, 213.1, 220.2, 221.3, 222.1, 222.2, 222.3; 312/242, 245; 16/222, 254, 260; 70/DIG. 57, 262

[56] References Cited

U.S. PATENT DOCUMENTS

| | | | |
|---|---|---|---|
| 2,100,928 | 11/1937 | Way | 16/163 |
| 2,282,384 | 6/1942 | Schenck | 250/16 |
| 2,758,257 | 8/1956 | Wills | 317/119 |
| 3,815,389 | 6/1974 | Richards, Sr. | 292/304 |
| 3,863,872 | 2/1975 | Godes | 248/47 |
| 4,720,622 | 1/1988 | Iwata et al. | 219/391 |
| 5,035,646 | 7/1991 | Ehrenfels et al. | 439/536 |

Primary Examiner—Robert W. Gibson, Jr.
Assistant Examiner—Catherine S. Collins
Attorney, Agent, or Firm—Quirk & Tratos

[57] ABSTRACT

An apparatus and method for mounting a hardware system in a wall is provided. A mounting bracket and bezel assembly and a rectangular wall frame device are attached to a wall. The bezel plate has a cam lock inserted through its upper portion. The wall frame device has a depth adjustment set screw through the top of the frame. That fits into the cam lock in the bezel plate. At least two angled T-shaped metallic tabs are located on the bottom of the wall frame device to receive the angled base of the assembly, which rests directly on these tabs. The method includes attaching the wall frame device around a suitably sized recessed rectangular hole in a wall. The assembly is attached to a rear portion of an electronics box with finger screws, and the angled base of the assembly is placed onto the lower edge of the wall frame device. The assembly is pushed into the wall frame device and the set screw is adjustable to ensure the assembly fits snugly against the wall.

20 Claims, 5 Drawing Sheets

APPARATUS AND METHOD FOR WALL-MOUNTED HARDWARE SYSTEM

FIELD OF TECHNOLOGY

The field of technology of this invention is mechanical systems, specifically techniques for mounting devices.

BACKGROUND

This invention relates to novel improvements and use in an apparatus and method for mounting devices onto walls, and more particularly, but not by way of limitation, to provide an apparatus and method for a wall-mounted hardware system.

Certain types of electronic boxes have traditionally been mounted on a wall, These boxes can range from the relatively simple to the highly complex. Existing systems for wall-mounting electronics boxes, such as intercom systems, radio speakers, monitoring devices, thermostats, and job management systems, include simple bracket hardware for hanging the box. Other ways to mount such boxes include using nails, screws or other, more direct fastening devices. Other types of electronics boxes include attendance management devices or time clock systems.

Numerous problems have been experienced with existing systems of mounting electronic boxes. A typical problem that for many years has plagued installers and users is not being able to determine the proper size and type of fastening devices. Still another problem that has not been overcome is not having a system that is secure from unintentional or intended tampering. And in addition, the sheer weight of some of the systems has meant having to reinstall them because of separation from the wall, through handling or just due to inadequate fastening devices.

Additional concerns have been expressed because servicing these systems has required extensive time to remove the system from the wall. Then the system needed to be taken to a maintenance shop. And finally, opening the electronics box for troubleshooting and servicing was time consuming because of the fastening devices used.

This field of mechanical devices and mounting apparatus, along with methods of servicing is well-known. Yet, long standing problems continue to occur with existing apparatus and methods. Thus there is a continuing need for improved apparatus and methods for mounting wall-mounted hardware systems.

SUMMARY OF THE INVENTION

The above problems, and others, are overcome by the apparatus and method of this invention. Briefly stated, the present invention provides a novel apparatus and method for mounting a hardware system on a wall.

In the preferred embodiment, this wall-mounted hardware system is used to mount an electronics box, or other electrically operated device. The system includes a mounting bracket and bezel assembly, and a wall frame device, all of which are attached to a wall.

The mounting bracket and bezel assembly consists of two parts, a bezel plate and a bracket. The bezel plate provides a surface through which a cam lock can be inserted and secured to the upper portion of the plate. In the preferred embodiment, the bezel plate is secured to the bracket and the assembly of these two parts is then secured to the wall frame device, and placed in an opening formed in a wall.

The wall frame device has a depth adjustment machine set screw that is secured through the top of the wall frame device. The cam lock in the bezel plate fits onto the set screw. This set screw is adjustable, which is a decided advantage in providing a system that can be properly secured. Once secured, unintentional or intentional tampering is virtually eliminated. In addition, this set screw requires only a single adjustment to set the cam lock in position. The adjustment feature accommodates a range of drywall thicknesses.

In the preferred embodiment, the bracket has an angled base. Also, the wall frame device has angled tabs located on the bottom portion of the frame device. The angled base of the bracket and the angled tabs of the wall frame device are novel features. The angled base rests directly on the angled tabs. The angular relationship between the base and tabs provides the means for pivoting the mounting bracket and bezel assembly easily into and out of the wall frame device. This pivoting feature allows for ease of access and servicing that is certainly a desirable advantage. This feature is simple and inexpensive. Once the cam lock is released, an electronics box mounted in this hardware system can easily swing out from the wall because of the pivoting feature. Once away from the wall, the electronics box can be easily lifted out of the wall recess for servicing.

Another advantage of this hardware system is using several finger screws to secure an electronics box to the bracket and bezel assembly. These finger screws are easily inserted and removed. These screws, plus the single set screw previously mentioned, and other readily available machine screws used to secure other parts all are preselected, based upon the design fastener requirements. Therefore, there is no doubt involved in deciding which fastener types to use. This is certainly an advantage to installers as well as servicing personnel. These predetermined fasteners also provide the necessary strength to hold various electronic boxes. In anticipation of various dry wall thicknesses likely to be encountered, the single set screw can be adjusted, as mentioned before. This adjustment ensures snug fit of a box into a wall, as well as allowing the cam lock to properly and easily lock for security purposes.

A preferred method of providing maintenance service access to a wall-mounted hardware system includes the following steps. First, a wall frame device is attached with screws around a suitably sized recessed rectangular hole in a wall. Then, the mounting bracket and bezel assembly is attached to a rear portion of an electronics box with several finger screws. Next, the angled base of the mounting bracket and bezel assembly is placed on angled tabs on the lower edge of the wall frame device. Finally, the mounting bracket and bezel assembly is pushed fully into the wall frame device. The depth adjustment set screw is then adjusted, as needed, to ensure that the mounting bracket and bezel assembly fit snugly and securely against the wall.

Optionally, in another embodiment, a wiring box panel is attached to the wall frame device with the same screws used to attach the wall frame device to the wall.

Problems overcome by this invention include: 1) difficulty in determining the size and type of fastening devices to use; 2) difficulty in providing a secure system; and 3) difficulty in gaining access to the electronic boxes for service.

Advantages of the present invention include 1) ease in determining fastener types to use; 2) providing a secure system; and 3) providing a simple and inexpensive method of servicing these wall-mounted electronic boxes.

These and other aspects of the apparatus and method of wall-mounting hardware systems of the present invention are set forth more completely in the accompanying figures and the following description.

BRIEF DESCRIPTION OF THE DRAWINGS

Details of the invention, and of the preferred embodiment thereof, will be further understood upon reference to the drawings, wherein:

FIG. 5a is an enlarged, partial portion of the hardware system apparatus substantially within the circle —B— in FIG. 5.

DETAILED DESCRIPTION OF THE PREFERRED EMBODIMENT

Figure 1:
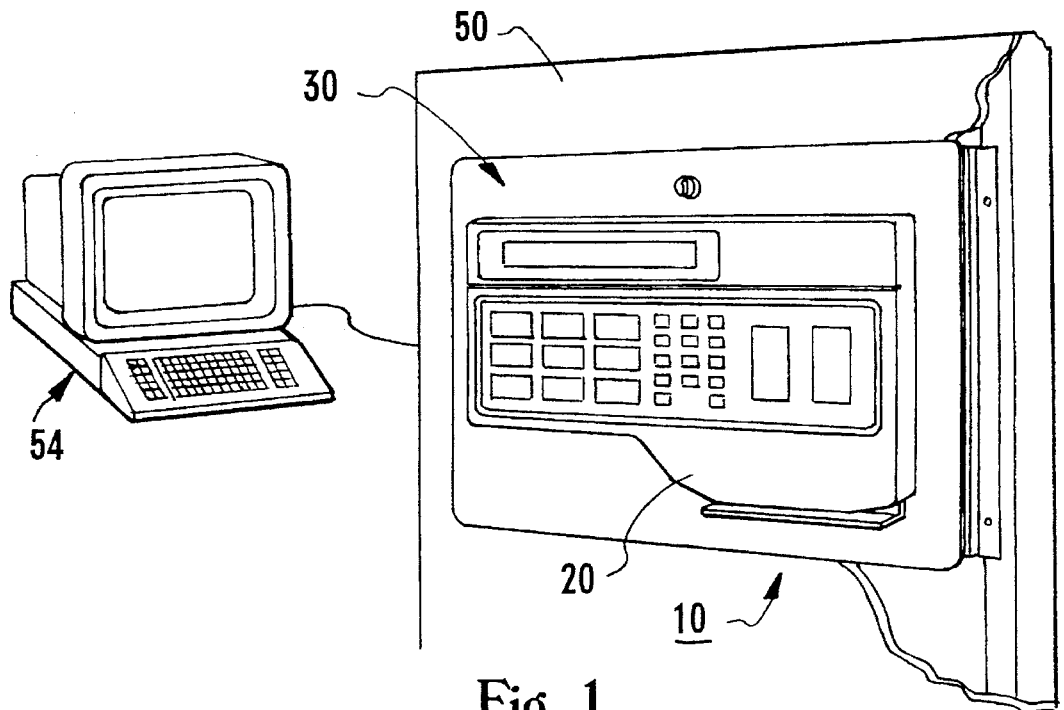
FIG. 1 is a perspective view of the wall-mounted hardware system apparatus shown installed in a preferred embodiment.

Referring initially to FIG. 1, there is seen the present invention in a preferred embodiment. A wall-mounted hardware system 10 is shown. An electronic box 20 is mounted within a rectangular mounting bracket and bezel assembly 30. Then the box 20 with the bracket and bezel assembly 30 is further installed in a wall 50. A computer terminal 54 is shown in the background of FIG. 1 as a device for monitoring inputs to the wall-mounted hardware system 10.

Figure 2:
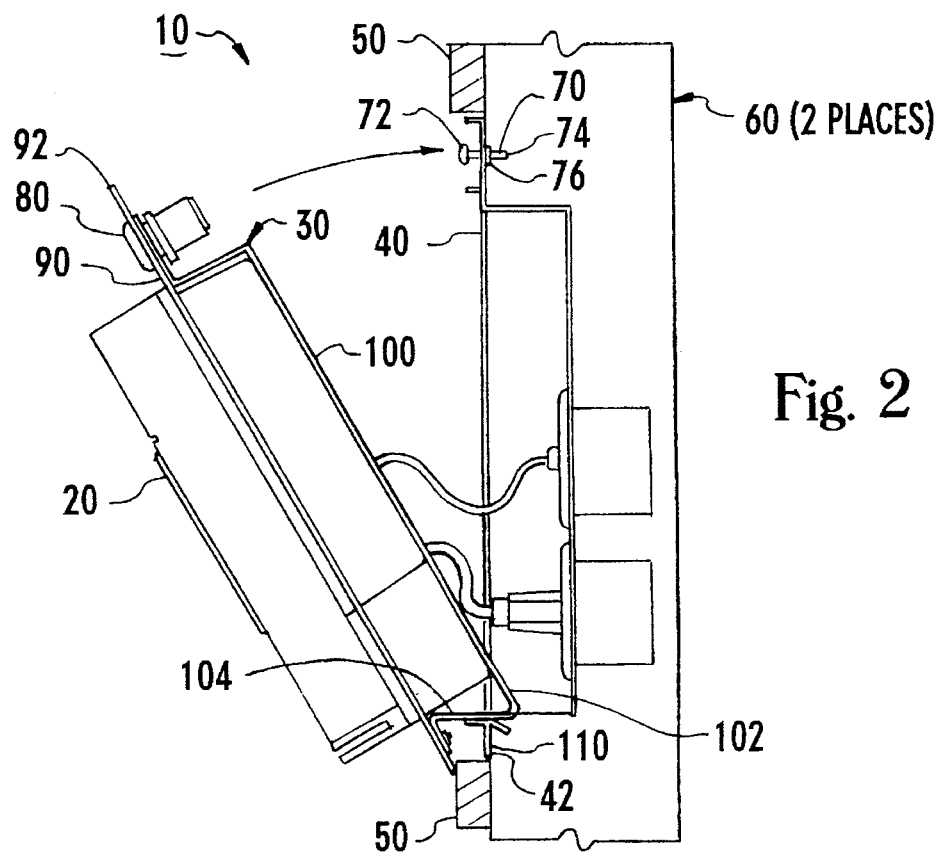
FIG. 2 is a detail partial right side elevation view, partially in section, of the wall-mounted hardware system apparatus shown in the open position for access or service.

Referring next to FIG. 2, the present invention is shown in the "open" position, lying away from the wall. This figure clearly shows ease of access for maintenance and servicing. As noted above, the wall-mounted hardware system 10 includes the mounting bracket and bezel assembly 30, and a wall frame device 40, all of which are attached to the wall 50 through a plurality of studs 60.

In the preferred embodiment, both the bracket and bezel assembly 30 and the frame device 40 are generally rectangular. The wall 50 is of drywall construction and of a thickness of approximately 0.4 to 0.8 inches (1.0 to 2.0 centimeters) in thickness. Also shown are details of a depth adjustment set screw 70 having a rounded top end 72, and a squared off end 74.

Drywall is made in various thicknesses, having an adjustable fastener, such as by using the easily adjustable set screw 70, accommodates these various thicknesses. Therefore, the electronics box 20 can be snugly secured into a recess of the wall 50. A nut 76 of appropriate size secures the set screw 70 in the wall frame device 40. The top rounded end 72 of the set screw 70 fits into a cam lock 80. This cam lock 80 is mounted in a bezel plate 90, which is part of the mounting bracket and bezel assembly 30. The cam lock 80 is centrally located in an upper portion 92 of the bezel plate 90.

This adjustable feature is a novel one, and a definite advantage for ensuring the security of a system that of necessity must be readily accessible to a number of users, and particularly with respect to such a system as utilizes electronic components. This feature certainly should also eliminate unintentional tampering, a relatively common risk.

The mounting bracket 100 is part of the mounting bracket and bezel assembly 30. A lower portion 102 of the mounting bracket 100 includes an angled base 104, which is shown resting on one, of preferably two, tabs 110 in the wall frame device 40. The tabs 110 are preferably metallic, widely separated, and located approximately at a lower edge 42 of the wall frame device 40.

Referring now to FIG. 3, there is again seen the wall-mounted hardware system 10, now in the closed position. This view shows the set screw 70 fully seated into the cam lock 80. The set screw 70 is of sufficient length and strength to snugly hold the mounting bracket and bezel assembly 30 against the wall 50 through the studs 60. In the preferred embodiment, there are two adjacent studs 60, and the depth adjustment set screw 70 is typically a #10 machine screw.

Figure 3:
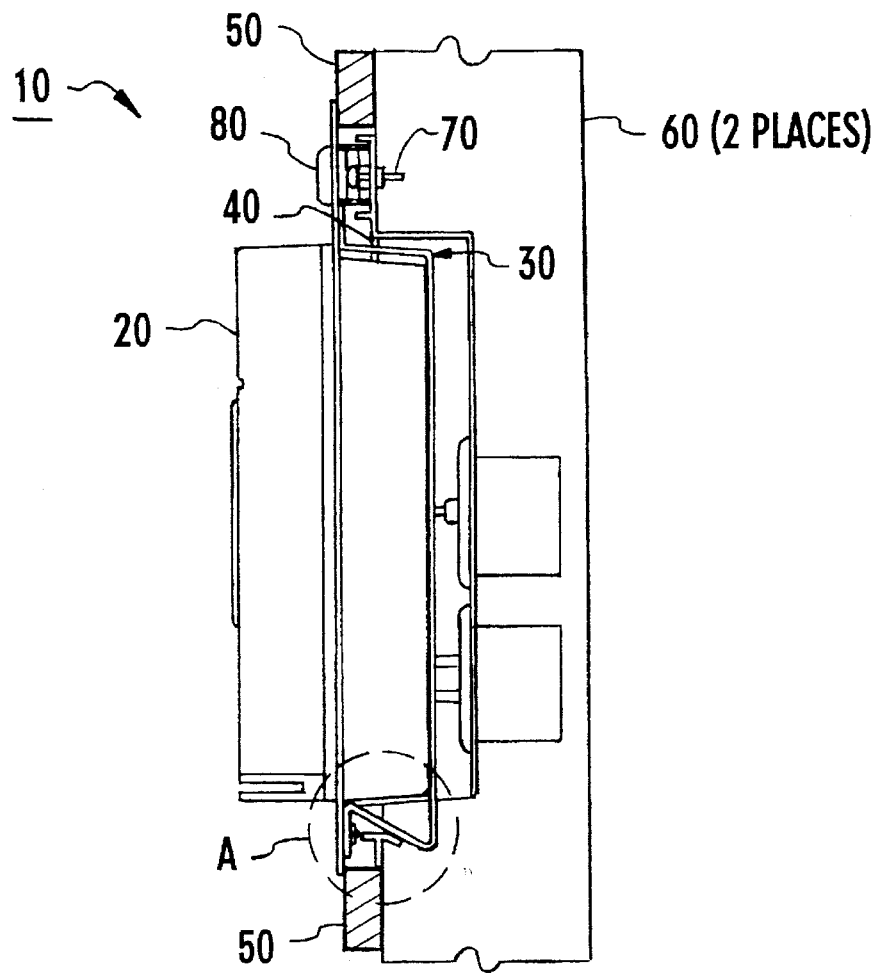
FIG. 3 is a detail partial right side elevation view, partially in section, of the same wall-mounted hardware system apparatus of FIG. 1, yet now shown in the closed position, and constructed in accordance with the present invention.
Figure 3A:
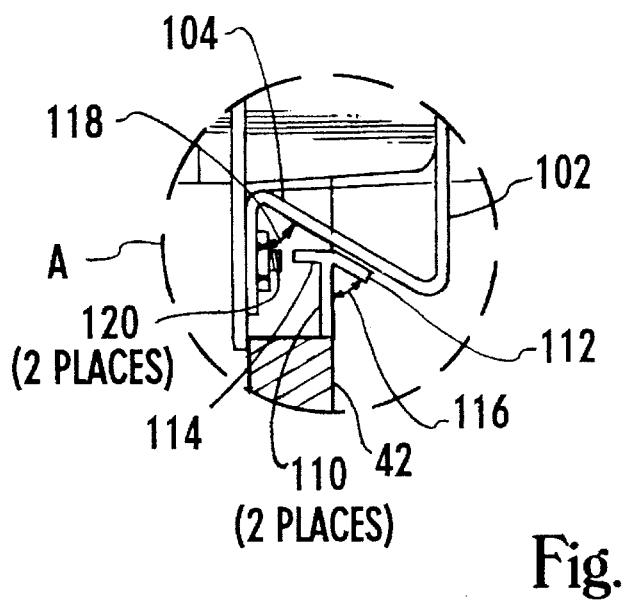
FIG. 3a is an enlarged, partial portion of the hardware system apparatus substantially within the circle —A— in FIG. 3.

Referring next to FIG. 3a, there are seen in a preferred embodiment at least two angled metallic tabs 110 located on the lower edge 42 of the wall frame device 40 (shown in FIG. 3). The angled base 104 of the mounting bracket and bezel assembly 30 (shown in FIG. 3) rests directly on the tabs 110. The angled base 104 also can slide over the tabs 110, and this relationship between the metallic tabs 110 and the angled base 104 provides means for slidably rotating and pivoting the mounting bracket and bezel assembly 30 into and out of the wall frame device 40. This feature allows for ease of access and servicing. The pivoting feature is also simple and inexpensive, which is an added benefit when considering the expense of the electronics box 20 itself. Each of the tabs 110 are generally "T"-shaped, and are of sufficient minimum thickness to support the weight of an electronics box 20 (shown in FIG. 3) and the mounting bracket and bezel assembly 30 into which the electronics box 20 fits, as seen by referring again to FIG. 2. Referring back to FIG. 3a, the tabs 110 have both an angled inner arm 112 and an outer arm 114. The inner arm 112 is manufactured to an acute angle 116 below the horizontal plane of the outer arm 114. The angled base 104 on the lower edge 102 of the mounting bracket 100 has a manufactured angle 118 identical to the acute angle 116 of the inner arm 112 of the angled metallic tabs 110. Also shown is one of two machine screws 120 explained more fully in FIG. 5.

When the cam lock 80 is released, the electronics box 20 can easily pivot on the angled metallic tabs 110. As needed then, the electronics box 20 could be easily removed for extensive servicing. This feature of easy access and ease of removing the electronics box 20 is a definite advantage of system 10. So often service technicians have to spend a great deal of time just getting to a desired component, much less actually removing the component for servicing.

Figure 4:
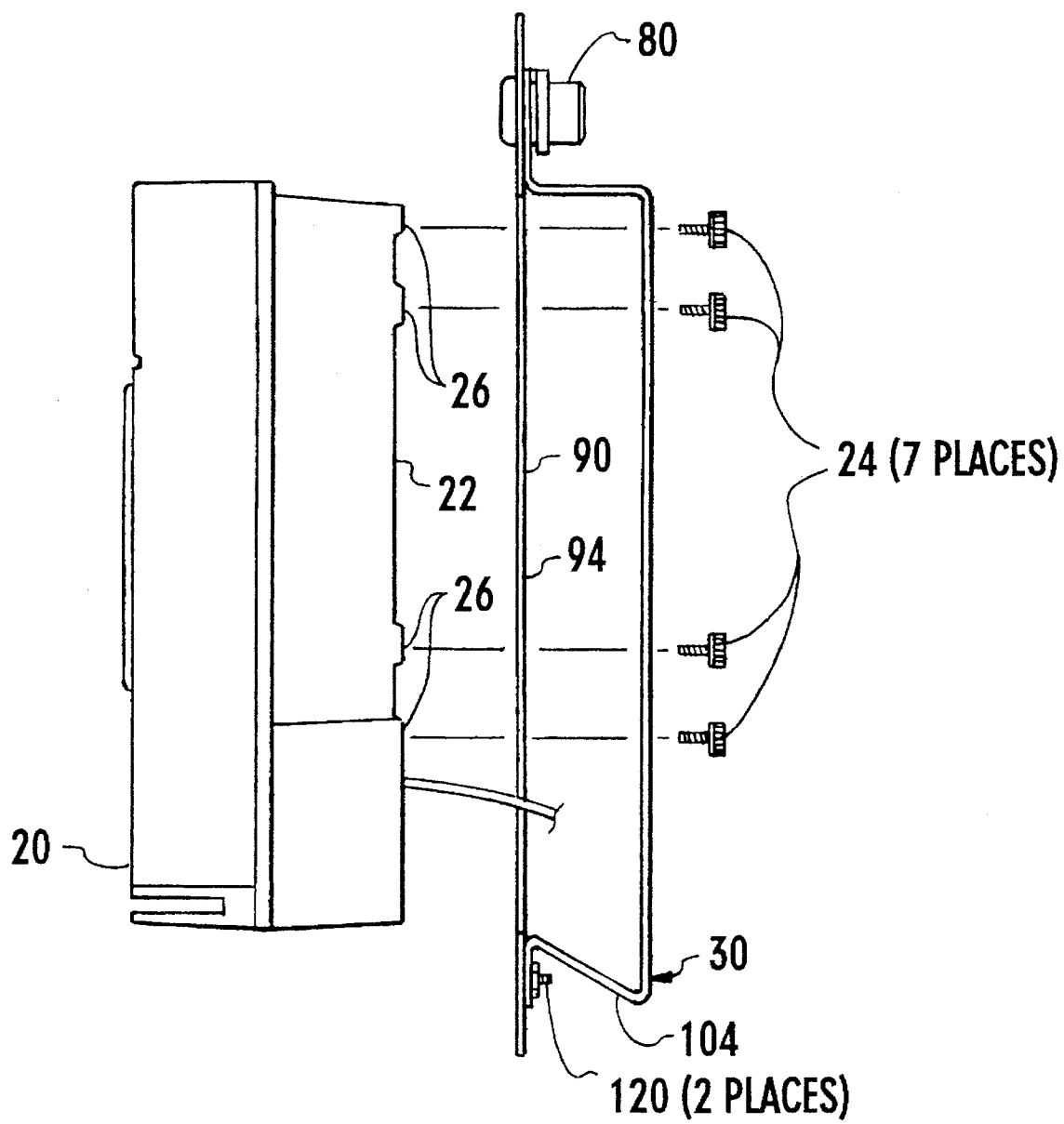
FIG. 4 is an exploded, side elevation view, showing how the mounted bracket and bezel assembly is attached to an electronics box within the wall-mounted hardware system apparatus shown in FIG. 1.

Referring now to FIG. 4, there is seen the apparatus for connecting the mounting bracket and bezel assembly 30 to the electronics box 20 by the use of a plurality of finger screws 24, preferably seven (not all are shown in the drawings). The finger screws 24 are inserted through the bracket and bezel assembly 30 from the back side 94 of the bezel plate 90 into grooved recessed receptacles 26 in a rear portion 22 of the electronics box 20. For clarity, the recessed receptacles 26 are not shown in FIGS. 2 and 3. The use of several finger screws 24 is still another advantage of this hardware system 10. The finger screws 24 are made for ease of installation and removal, and therefore as an aid to the service technicians.

Figure 5:
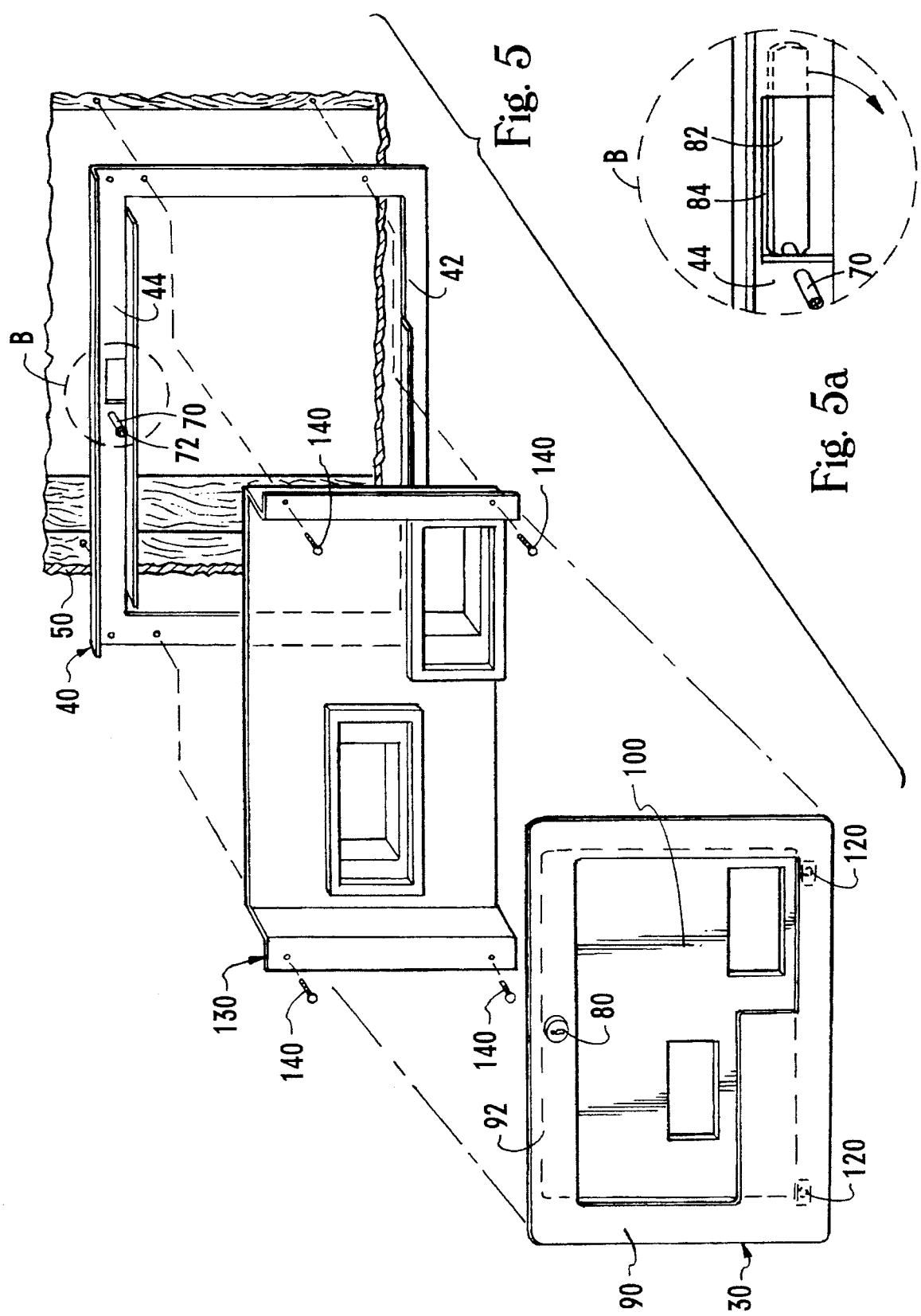
FIG. 5 is an exploded perspective view of components within the wall-mounted hardware system apparatus shown in FIG. 1.

Referring next to FIG. 5, there is seen the mounting bracket and bezel assembly 30 in an exploded perspective view. The assembly 30 consists of the rectangular bracket 100 and the cosmetic rectangular bezel plate 90. The cosmetic bezel plate 90 is rigidly attached to the bracket 100 with a plurality of plate machine screws 120, preferably two, to the bracket 100. A wiring box panel 130 is also shown. The box panel 130 is optional and, in another embodiment, would preferably be generally rectangular.

The box panel 130 has a plurality of bracket machine screws 140 that are fitted into the box panel 130 through the wall frame device 40 and into the wall 50. Sufficient numbers, preferably four to six, of typical #10 hardware machine screws are used for providing sufficient strength for holding the wall frame device 40 to the wall 50.

All of the fastening devices mentioned already are predetermined in size and strength. These devices include the finger screws 24 (see FIG. 4), the depth adjustment set screw 70, the plate machine screws 120, and the bracket machine screws 140. Because these fasteners are pre-selected for their respective function(s), service technicians and installing personnel have an advantage in knowing what is required. In addition, the novel single set screw 70 can be adjusted allowing accommodation of different drywall thicknesses, plus this feature allows the cam lock 80 to easily lock to secure the electronics box 20.

The bezel plate 90 has the cam lock 80 inserted through and secured to the upper portion 92 on the plate 90. The rectangular wall frame device 40 again shows the depth adjustment machine set screw 70 inserted through a top part 44 of the wall frame device 40.

Referring now to FIG. 5a, there are seen details of a cam 82, which is part of the cam lock 80. The depth adjustment set screw 70 is secured through the cam 82 by the nut 76 previously described in FIG. 2. (The nut 76 is not shown behind the cam 82 for clarity). The cam 82 is shown behind the top part 44 through a window 84 formed in the top part 44. The cam 82, when rotated clockwise by using the set screw 70 as illustrated in FIG. 5a, snugly secures the mounting bracket and bezel assembly 30 into the wall frame device 40 (shown in FIG. 5).

Figure 6:
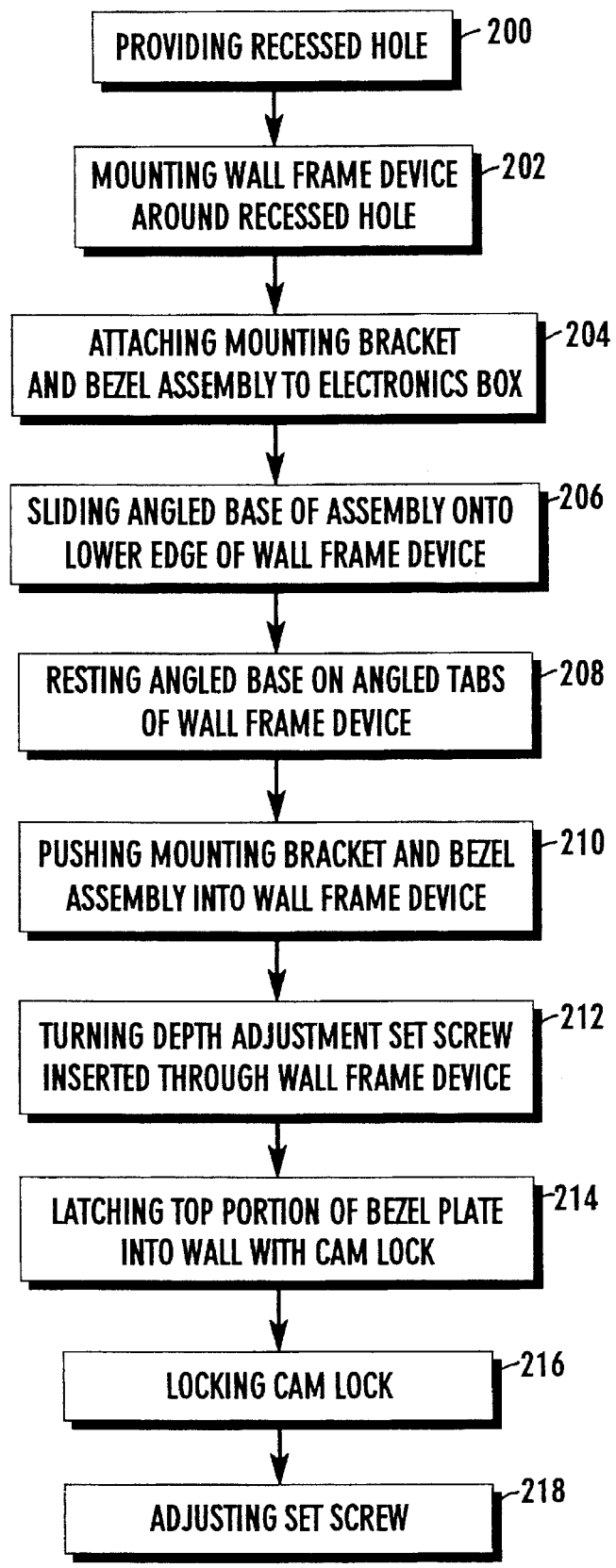
FIG. 6 is a block diagram illustrating the preferred method of mounting a wall-mounted hardware system apparatus shown in FIG. 1.

Referring finally to FIG. 6, there is seen a block diagram that substantially illustrates the steps to the method of the invention of mounting a wall-mounted hardware system.

The first step, as indicated in box 200, is providing a recessed rectangular hole of suitable dimensions into the wall 50.

The second step, as indicated in box 202, is mounting the wall frame device 40 around the recessed hole in the wall 50. The mounting of the wall frame device 40 is accomplished by using sufficient numbers, preferably four to six, of typical #10 hardware machine screws for providing sufficient strength to hold the wall frame device 40 to the wall 50.

The third step, as indicated in box 204, is attaching a mounting bracket and bezel assembly 30 to the rear portion 22 of the electronics box 20 with the plurality of finger screws 24, preferably seven. The finger screws 24 are inserted into the grooved receptacles 26 in the rear portion 22 of the electronics box 20. See FIG. 5.

The next step, as indicated in box 206, is sliding the angled base 104 of the mounting bracket and bezel assembly 30 onto the lower edge 42 of the wall frame device 40. See FIG. 2.

The next step, as indicated in box 208, is resting the angled base 104 on the plurality of angled tabs 110, preferably two, of the wall frame device 40.

The next step, as indicated in box 210, is pushing the mounting bracket and bezel assembly 30 fully into the wall frame device 40. See FIG. 3.

The next step, if needed, as indicated in box 212, is turning a depth adjustment set screw 70, inserted through the wall frame device 40, in a clockwise direction, allowing the bezel plate 90 of the mounting bracket and bezel assembly 30 to fit snugly against the wall 50.

The next step, as indicated in box 214, is latching the top portion 92 of the bezel plate 90 into the wall 50 with the cam lock 80.

The next step, as indicated in box 216, is locking the cam lock 80 in position by rotating the cam lock 80 180 degrees clockwise by using a cam lock key (not shown) in the cam lock 80.

The last step, if needed, as indicated in box 218, is adjusting the set screw 70 by first removing the mounting bracket and bezel assembly 30, then turning the set screw 70 counter clockwise until the cam lock 80 clears the set screw 70. This step permits the set screw 70 to fully seat in the cam lock 80, allowing the cam lock 80 to fully rotate 180 degrees clockwise. When the cam lock 80 does fully rotate 180 degrees clockwise, it positively locks the mounting bracket and bezel assembly 30 into the wall frame device 40.

It can now be seen that the present invention provides a simple, easy to use, inexpensive method that provides easy maintenance access for servicing wall-mounted electronics boxes.

The foregoing description of the invention is explanatory thereof and various changes in the size, shape, and materials, as well as on the details of illustrated construction may be made, within the scope of the appended claims, without departing from the spirit of the invention.

What is claimed is:

1. A wall-mounted hardware system, including an electronics box mounted into a mounting bracket and bezel assembly secured within a wall frame device that frames a hole in a wall, the wall frame device being directly affixed to the wall, which comprises, a set screw inserted through said wall frame device;

a cam lock secured through an upper portion of said mounting bracket and bezel assembly, said cam lock receiving said set screw;

means for slidably rotating and pivoting said mounting bracket and bezel assembly into and out of said wall frame device.

2. The apparatus according to claim 1, wherein said set screw is a depth adjustment set screw of sufficient length and strength to fully seat into said cam lock and to snugly hold said mounting bracket and bezel assembly against said wall using an appropriate sized nut.

3. The apparatus according to claim 1, wherein said means for slidably rotating and pivoting said mounting bracket and bezel assembly into and out of said wall frame device comprises an angled base of said mounting bracket and bezel assembly and at least two angled tabs.

4. The apparatus according to claim 3, wherein each of said tabs being generally "T"-shaped.

5. The apparatus according to claim 3, wherein said tabs are metallic and of sufficient minimum thickness to sustain the weight of said electronics box and said mounting bracket and bezel assembly.

6. The apparatus according to claim 3, wherein said tabs further comprise an inner arm and an outer arm, said inner arm being manufactured to an acute angle below the horizontal plane of said outer arm.

7. The apparatus according to claim 3, wherein said angled base of said mounting bracket and bezel assembly forms an angle approximately equal to an angle formed by an inner arm of said tabs.

8. The apparatus according to claim 1 additionally comprising a wiring box panel connected to said mounting bracket and bezel assembly and to said wall frame device.

9. A wall-mounted hardware system, including an electronics box mounted into a mounting bracket and bezel assembly secured within a wall frame device that frames a hole in a wall, the wall frame device being directly affixed to the wall, which comprises, a set screw inserted through said wall frame device;

a cam lock secured through an upper portion of said mounting bracket and bezel assembly, said cam lock receiving said set screw;

two generally "T" shaped metallic tabs located on a bottom end of said wall frame device; and an angled base of said mounting bracket and bezel assembly that slidably rests on said tabs.

10. A wall-mounted hardware system, including an electronics box mounted into a mounting bracket and bezel assembly secured within a wall frame device that frames a hole in a wall, the wall frame device being directly affixed to the wall, which comprises, a set screw inserted through said wall frame device;

a cam lock secured through an upper portion of said mounting bracket and bezel assembly, said cam lock receiving said set screw;

a plurality of tabs located on a bottom end of said wall frame device, each of said tabs including an inner arm and an outer arm, said outer arms extending in a horizontal plane said inner arm extending at an acute angle below the horizontal plane of said outer arm; and an angled base of said mounting bracket and bezel assembly that slidably rests on said tabs.

11. A wall-mounted hardware system, including an electronics box mounted into a mounting bracket and bezel assembly secured within a wall frame device that frames a hole in a wall, the wall frame device being directly affixed to the wall, which comprises, a set screw inserted through said wall frame device;

a cam lock secured through an upper portion of said mounting bracket and bezel assembly, said cam lock receiving said set screw;

a plurality of tabs located on a bottom end of said wall frame device, each of said tabs having an angled inner arm; and an angled base of said mounting bracket and bezel assembly that slidably rests on said tabs, said angled base of said mounting bracket and bezel assembly forming an angle approximately equal to the angle formed by at least one of said angled inner arms of said tabs.

12. An apparatus providing simplified access for maintenance service to a mounted hardware system comprising:

a mounting assembly having a mounting bracket and a bezel plate, said mounting bracket having an angled base;

a wall frame device wherein said mounting assembly is secured, said wall frame device being connected to angled metallic tabs which slidably cooperate with said angled base;

a mounting means for securing said wall frame device to a wall;

an attaching means for securing said mounting assembly to a rear portion of an electronics box;

a latching means for securing said mounting assembly into said wall; and an adjusting means for positively locking said mounting assembly into said wall frame device.

13. The apparatus of claim 12, wherein said mounting means comprises a plurality of machine screws.

14. The apparatus of claim 12, wherein said attaching means comprises a plurality of finger screws.

15. The apparatus of claim 12, wherein said fitting means comprises a depth adjustment set screw insertable through said wall frame device into said wall, and further wherein said set screw is turnable in a direction allowing said bezel plate to fit snugly against said wall.

16. The apparatus of claim 12, wherein said latching means comprises a cam lock, and further wherein said cam lock is rotatable.

17. The apparatus of claim 12, wherein said adjusting means comprises a depth adjustment set screw cooperating with a cam lock to fully seat said set screw in said cam lock, and further that said set screw is adjustable to allow said cam lock to rotate in a direction locking said mounting assembly into said wall frame device.

18. A method of providing maintenance service access to a wall-mounted hardware system, which comprises the steps of:

providing a recessed rectangular hole of suitable dimensions into a wall;

mounting a wall frame device around said hole;

attaching a mounting bracket and bezel assembly having an angled base to a rear portion of an electronics box with a plurality of finger screws;

sliding the angled base of said mounting bracket and bezel assembly onto the lower edge of said wall frame device;

resting said angled base on a plurality of angled metallic tabs of said wall frame device;

pushing said mounting bracket and bezel assembly fully into said wall frame device;

turning a depth adjustment set screw, inserted through said wall frame device, in a clockwise direction allowing a bezel plate of said mounting bracket and bezel assembly to fit snugly against said wall;

latching the upper portion of said mounting bracket and bezel assembly into said wall with a cam lock;

locking said cam lock in position by rotating said cam lock 180 degrees clockwise by using a cam lock key in said cam lock; and adjusting said set screw.

19. The method according to claim 18, wherein the mounting of said wall frame device is accomplished by using sufficient numbers of typical #10 hardware machine screws for providing sufficient strength for holding said wall frame device to said wall.

20. The method according to claim 18, wherein said adjusting is accomplished by first removing said mounting bracket and bezel assembly, then turning said set screw counterclockwise until said cam lock clears said set screw, permitting said set screw to fully seat in said cam lock, further allowing said cam lock to fully rotate 180 degrees clockwise to definitively lock said mounting bracket and bezel assembly into said wall frame device.

* * * * *